US009553337B2

United States Patent
Chae et al.

(10) Patent No.: US 9,553,337 B2
(45) Date of Patent: Jan. 24, 2017

(54) SODIUM SECONDARY BATTERY

(71) Applicants: SK Innovation Co., Ltd., Seoul (KR); Ceramatec, Inc., Salt Lake City, UT (US)

(72) Inventors: Je Hyun Chae, Daejeon (KR); Won Sang Koh, Daejeon (KR); Seung Ok Lee, Daejeon (KR); Dai In Park, Daejeon (KR); Jeong Soo Kim, Daejeon (KR); Sai Bhavaraju, West Jordan, UT (US); Mathew Richard Robins, Saratoga Springs, UT (US); Alexis L. Eccleston, Midvale, UT (US); Ashok V. Joshi, Salt Lake City, UT (US)

(73) Assignees: SK Innovation Co., Ltd., Seoul (KR); Ceramatec, Inc., Salt Lake City, UT (US)

( * ) Notice: Subject to any disclaimer, the term of this patent is extended or adjusted under 35 U.S.C. 154(b) by 232 days.

(21) Appl. No.: 14/555,852

(22) Filed: Nov. 28, 2014

(65) Prior Publication Data

US 2015/0147619 A1 May 28, 2015

(30) Foreign Application Priority Data

Nov. 28, 2013 (KR) .................. 10-2013-0146182

(51) Int. Cl.
| | | |
|---|---|---|
| H01M 4/58 | (2010.01) | |
| H01M 10/39 | (2006.01) | |
| H01M 4/38 | (2006.01) | |

(52) U.S. Cl.
CPC ........... *H01M 10/399* (2013.01); *H01M 4/381* (2013.01); *H01M 2300/0054* (2013.01)

(58) Field of Classification Search
None
See application file for complete search history.

(56) References Cited

U.S. PATENT DOCUMENTS 7,833,660 B1 * 11/2010 Zhang ................... C01B 35/06
 252/62.2
2003/0054255 A1 3/2003 Hidaka et al.

* cited by examiner

*Primary Examiner* — Cynthia K Walls
(74) *Attorney, Agent, or Firm* — The Webb law Firm

(57) ABSTRACT

Provided is a sodium secondary battery capable of operating at a low temperature. More particularly, the sodium secondary battery according to the present invention includes: an anode containing sodium; a cathode containing a transition metal and an alkali metal halide; and a sodium ion conductive solid electrolyte provided between the anode and the cathode, wherein the cathode is impregnated in a molten salt electrolyte containing a sodium.metal halogen salt including at least two kinds of halogens.

9 Claims, 1 Drawing Sheet

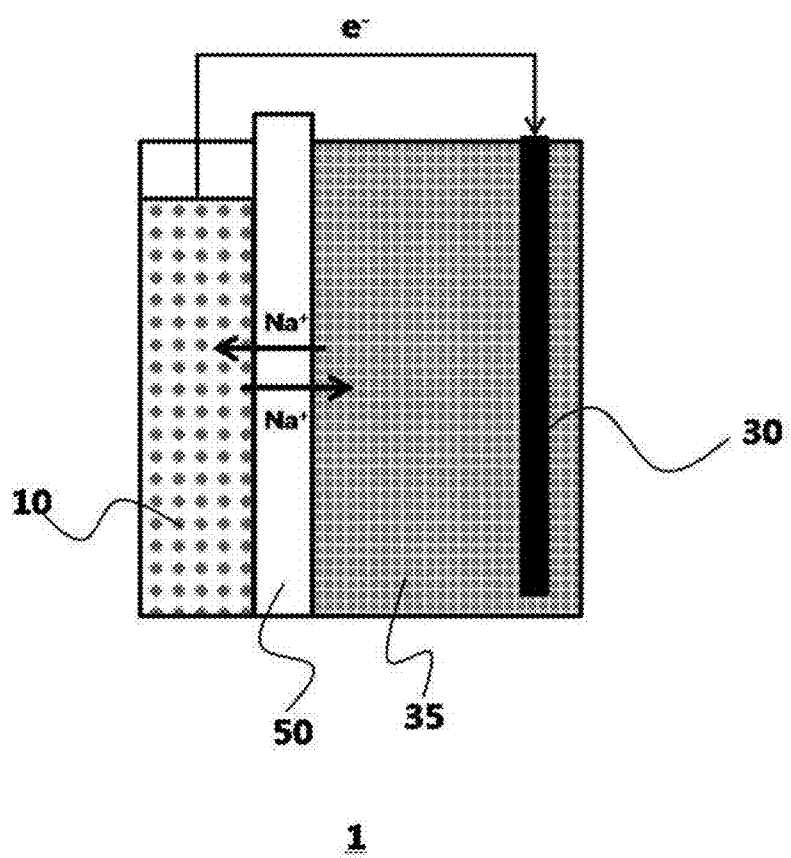

SODIUM SECONDARY BATTERY

CROSS-REFERENCE TO RELATED APPLICATIONS

This application claims priority under 35 U.S.C. §119 to Korean Patent Application No. 10-2013-0146182, filed on Nov. 28, 2013, in the Korean Intellectual Property Office, the disclosure of which is incorporated herein by reference in its entirety.

TECHNICAL FIELD

The following disclosure relates to a sodium secondary battery, and more particularly, to a sodium secondary battery containing a molten salt electrolyte having a decreased melting point.

BACKGROUND

In accordance with a rapid increase in the use of renewable energy, the necessity for an energy storage device using a battery has rapidly increased. Among these batteries, a lead battery, a nickel/hydrogen battery, a vanadium battery, and a lithium battery may be used. However, since the lead battery and the nickel/hydrogen battery have significantly low energy density, they require a large space in order to store the same capacity of energy therein. Further, in the case of the vanadium battery, the vanadium battery uses a solution containing a heavy metal, which causes environmental contamination, and a small amount of materials may move between an anode and a cathode through a membrane separating the anode and the cathode from each other, which deteriorates performance. Therefore, the vanadium battery cannot be commercialized on a large scale. The lithium battery having significantly excellent energy density and output characteristics is significantly advantageous in view of a technology. However, the lithium battery is disadvantageous in view of economic efficiency for being used as a secondary battery for large scale power storage due to resource scarcity of a lithium material.

In order to solve this problem, many attempts to use sodium, which is a resource sufficiently present on Earth, as a material of the secondary battery have been conducted. Among them, as disclosed in U.S. Patent Application Publication No. 20030054255, a sodium-sulfur battery having a form in which a beta alumina having selective conductivity for a sodium ion is used, an anode contains sodium, and a cathode contains sulfur has been currently used as a large scale power storage device.

However, in the existing sodium based secondary battery such as the sodium-sulfur battery or a sodium-nickel chloride battery, conductivity thereof and melting points of battery compositions should be considered. For example, the sodium-nickel chloride battery has an operation temperature of at least 250° C. or more, and the sodium-sulfur battery has an operation temperature of at least 300° C. or more. Due to this problem, there are many disadvantages in view of economical efficiency in manufacturing or operating the sodium based secondary battery while maintaining a temperature and sealability of the battery and reinforcing the safety thereof. In order to solve the above-mentioned problems, a room-temperature sodium based battery has been developed, but the output thereof is significantly low, such that the room-temperature sodium based battery has significantly low competitiveness as compared with the nickel-hydrogen battery or the lithium battery.

RELATED ART DOCUMENT

Patent Document

U.S. Patent Application Publication No. 20030054255

SUMMARY

An embodiment of the present invention is directed to providing a sodium secondary battery capable of operating at a low temperature, and more particularly, a sodium secondary battery capable of operating at a low temperature while maintaining ion conductivity, significantly improving output efficiency of the battery, stably maintaining charge and discharge cycle characteristics for a long period of time, preventing degradation to improve a battery lifespan, and improving stability of the battery.

In one general aspect, a sodium secondary battery includes: an anode containing sodium; a cathode containing a transition metal and an alkali metal halide; and a sodium ion conductive solid electrolyte provided between the anode and the cathode, wherein the cathode is impregnated in a molten salt electrolyte represented by the following Chemical Formula 1.

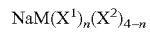        Chemical Formula 1

In Chemical Formula 1,

M may be an element selected from metal and metalloid groups having an oxidation number of 3;

$X^1$ and $X^2$ may be each independently selected from halogen elements; and n may be more than 0 but less than 4 (0<n<4).

n may be 0.2 or more but 3.8 or less (0.2≤n≤3.8).

$X^1$ may be chlorine (Cl), and $X^2$ may be iodine (I), and n may be 2.0 or more but 3.8 or less (2.0≤n≤3.8).

$X^1$ may be chlorine (Cl), and $X^2$ may be bromine (Br), and n may be 0.2 or more but 3.8 or less 0.2≤n≤3.8).

M may be boron, aluminum, gallium, or indium.

The molten salt electrolyte may have a melting point of 150° C. or less.

The molten salt electrolyte may further contain an electrode active material made of a sodium halide salt.

The anode may contain a sodium metal or a sodium alloy.

The sodium secondary battery may have an operation temperature of 100 to 200° C.

BRIEF DESCRIPTION OF THE DRAWINGS

FIG. 1 is a conceptual view schematically showing a sodium secondary battery according to an exemplary embodiment of the present invention.

DETAILED DESCRIPTION OF MAIN ELEMENTS

1: Sodium secondary battery
10: Anode
30: Cathode
35: Molten salt electrolyte
50: Solid electrolyte

DETAILED DESCRIPTION OF EMBODIMENTS

Hereinafter, a sodium secondary battery according to the present invention will be described in detail with reference to the accompanying drawing. The following accompanying drawing is provided by way of example so that the idea of the present invention can be sufficiently transferred to those skilled in the art to which the present invention pertains. Therefore, the present invention is not limited to the drawing to be provided below, but may be modified in many different forms. In addition, the drawings to be provided below may be exaggerated in order to clarify the scope of the present invention. Like reference numerals denote like elements throughout the specification.

Here, technical terms and scientific terms used in the present specification have the general meaning understood by those skilled in the art to which the present invention pertains unless otherwise defined, and a description for the known function and configuration unnecessarily obscuring the present invention will be omitted in the following description and the accompanying drawings.

In general, as a molten salt electrolyte of a secondary battery such as a zebra battery, or the like, sodium aluminum chloride ($NaAlCl_4$) has been used. It has been known that the sodium aluminum chloride ($NaAlCl_4$) molten salt as described above is advantageous in view of stability and ion conductivity of a sodium secondary battery.

However, since the sodium aluminum chloride ($NaAlCl_4$) molten salt has a melting point of 158 to 200° C. depending on purity thereof, there is a limitation in that an operation temperature of a secondary battery using the sodium aluminum chloride ($NaAlCl_4$) molten salt electrolyte as described above is significantly high.

Therefore, in order to overcome the limitation as described above, the present invention is to provide a secondary battery capable of operating at a relatively low temperature by decreasing a melting point of a molten salt electrolyte while having excellent ion conductivity.

The secondary battery according to the present invention may be an alkali metal secondary battery. In detail, the secondary battery according to the present invention may be a sodium secondary battery. In more detail, the sodium secondary battery according to the present invention may be a sodium secondary battery using a molten salt electrolyte. More specifically, the sodium secondary battery according to the present invention may be a sodium secondary battery using a molten salt electrolyte prepared from at least two kinds of sodium.metal halogen salts.

The present applicant found that in the case a molten sodium electrolyte containing a sodium.metal halogen salt including two kinds or more halogens, a melting point was significantly decreased without decreasing the ion conductivity, such that the molten sodium electrolyte had excellent conditions for being used as an electrolyte of the secondary battery. Particularly, the present applicant found that when at least two kinds of halogens were mixed and prepared with each other at a specific ratio (equivalent ratio), the melting point of the molten salt electrolyte was significantly decreased. As a result of the research as described above, the present invention is applied.

Therefore, the sodium secondary battery according to the present invention may contain a molten salt electrolyte represented by the following Chemical Formula 1.

$NaM(X^1)_n(X^2)_{4-n}$ <span style="float:right">Chemical Formula 1</span>

In Chemical Formula 1, M may be an element selected from metal and metalloid groups having an oxidation number of 3, and $X^1$ and $X^2$ may be each independently selected from halogen elements. Further, it is preferable that n is selected in a range of more than 0 but less than 4 (0<n<4), thereby securing that the salt represented by Chemical Formula 1 contains at least two kinds of halogens. In view of decreasing the melting point to 150° C. or less, more specifically, 100 to 150° C. to manufacture a sodium secondary battery capable of operating at a low temperature, it is more preferable that n is 0.2 or more but 3.8 or less (0.2≤n≤3.8).

Further, in the sodium secondary battery according to the present invention, a metal element of the molten salt electrolyte may be boron, aluminum, gallium, or indium. Preferably, the metal element may be aluminum (Al) or boron (B). Therefore, it is preferable that at least one kind of sodium aluminum halogen salt or sodium boron halogen salt is contained in the molten salt electrolyte according to the present invention.

Furthermore, in the sodium secondary battery according to the present invention, two kinds of halogens may be contained in the molten salt electrolyte. More specifically, in order to have a pair configuring a molten salt electrolyte of which a melting point is a predetermined value or less, when in Chemical Formula 1, $X^1$ is chlorine (Cl) and $X^2$ is iodine (I), n may be 2.0 or more but 3.8 or less (2.0≤n≤3.8), or when $X^1$ is chlorine (Cl) and $X^2$ is bromine (Br), n may be 0.2 or more but 3.8 or less (0.2≤n≤3.8).

In the sodium secondary battery according to the present invention, the molten salt electrolyte represented by Chemical Formula 1 as described above may be prepared by mixing a first salt represented by the following Chemical Formula 2 and a second salt represented by Chemical Formula 3 with each other.

$NaM(X^1)_4$ <span style="float:right">Chemical Formula 2</span>

$NaM(X^2)_4$ <span style="float:right">Chemical Formula 3</span>

In Chemical Formulas 2 and 3, M may be an element selected from metal and metalloid groups having an oxidation number of 3. More specifically, M may be selected from boron, aluminum, gallium, or indium and may be equal to or different from each other. Further, $X^1$ and $X^2$ may be each independently selected from halogen elements.

That is, in the sodium secondary battery according to the present invention, the molten salt electrolyte represented by Chemical Formula 1 may be prepared by mixing the first salt, which is a sodium.metal halogen salt represented by Chemical Formula 2, and the second salt, which is a sodium.metal halogen salt represented by Chemical Formula 3, with each other. Here, contents of two kinds of halogens contained in the prepared molten salt electrolyte may be changed according to a mixing ratio of the first and second salts, and accordingly, the melting point may be decreased. Here, a description of the contents of the two kinds of halogens according to the mixing ratio of the first and second salts and the molten salt electrolyte prepared according to the contents will be replaced with a description in the Examples to be described below.

Further, in the sodium secondary battery according to the present invention, the molten salt electrolyte represented by Chemical Formula 1 as described above may be prepared by mixing at least one third salt represented by the following Chemical Formula 4 and at least one fourth salt represented by Chemical Formula 5 with each other.

$Na(X^1)$ <span style="float:right">Chemical Formula 4</span>

$M(X^2)_3$ <span style="float:right">Chemical Formula 5</span>

In Chemical Formulas 4 and 5, M may be an element selected from metal and metalloid groups having an oxidation number of 3, and $X^1$ and $X^2$ may be each independently selected from halogen elements.

That is, in the sodium secondary battery according to the present invention, the molten salt electrolyte represented by Chemical Formula 1 may be prepared by mixing the third salt, which is at least one sodium.halogen salt represented by Chemical Formula 4, and the fourth salt, which is at least one metal halogen salt represented by Chemical Formula 5, with each other. Here, contents of two kinds of halogens contained in the prepared molten salt electrolyte may be changed according to a mixing ratio of the third and fourth salts, and accordingly, the melting point may be decreased. Here, a description of the contents of the two kinds of halogens according to the mixing ratio of the third and fourth salts and the molten salt electrolyte prepared according to the contents will be replaced with a description in the Examples to be described below.

In addition, at the time of preparing the molten salt electrolyte according to the present invention, the sodium.halogen salt may act as an electrode active material in a state in which it is molten in the molten salt electrolyte as the residue after forming the molten salt electrolyte by intentionally over-supplying a small amount of the sodium.halogen salt represented by Chemical Formula 4. That is, in the sodium secondary battery according to the present invention, the molten salt electrolyte may further contain an electrode active material made of a sodium halide salt.

Further, the above-mentioned sodium.metal halogen salt (first salt) represented by Chemical Formula 2 or the above-mentioned sodium.metal halogen salt (second salt) represented by Chemical Formula 3 may be prepared by mixing the third and fourth salts represented by Chemical Formulas 4 and 5 with each other as described above, and the molten salt electrolyte according to the present invention may be prepared by mixing the first and second salts prepared as described above.

Hereinafter, Examples of the molten salt electrolyte configured as described above and a melting point in each Example will be described in detail and shown in [Table 1]. However, Examples to be described in detail are not to limit the present invention but may be expanded in a range in which they satisfy the present invention.

Example 1

A melting point was confirmed while mixing a first salt ($NaAlCl_4$) and a second salt ($NaAlI_4$) at a predetermined ratio. A melting point of an electrolyte prepared by mixing $NaAlCl_4$ and $NaAlI_4$ at a molar ratio of 9.5:0.5 was 150° C., such that it was confirmed that the melting point was lower than that of a single salt ($NaAlCl_4$ (Comparative Example 1) or $NaAlI_4$ (Comparative Example 2)) and ion conductivity was suitable for implementing a battery.

Example 2

A melting point was confirmed while mixing the first salt ($NaAlCl_4$) and the second salt ($NaAlI_4$) at a predetermined ratio. A melting point of an electrolyte prepared by mixing $NaAlCl_4$ and $NaAlI_4$ at a molar ratio of 9:1 was 130° C., such that it was confirmed that the melting point was lower than that of the single salt ($NaAlCl_4$ (Comparative Example 1) or $NaAlI_4$ (Comparative Example 2)) and ion conductivity was suitable for implementing a battery.

Example 3

A melting point was confirmed while mixing the first salt ($NaAlCl_4$) and the second salt ($NaAlI_4$) at a predetermined ratio. A melting point of an electrolyte prepared by mixing $NaAlCl_4$ and $NaAlI_4$ at a molar ratio of 7:3 was 100° C., such that it was confirmed that the melting point was lower than that of the single salt ($NaAlCl_4$ (Comparative Example 1) or $NaAlI_4$ (Comparative Example 2)) and ion conductivity was suitable for implementing a battery.

Example 4

A melting point was confirmed while mixing three kinds of salt (that is, third salts (NaCl and NaBr) and a fourth salt ($AlCl_3$)) at a predetermined ratio. In this case, a melting point of an electrolyte prepared by mixing NaCl, NaBr, and $AlCl_3$ at a molar ratio of 1:3:4 was 113° C., such that it was confirmed that the melting point was lower than that of the single salt ($NaAlCl_4$ (Comparative Example 1) or $NaAlBr_4$ (Comparative Example 3)) and ion conductivity was suitable for implementing a battery.

Example 5

A melting point was confirmed while mixing three kinds of salts (that is, third salts (NaCl and NaBr) and a fourth salt ($AlCl_3$)) at a predetermined ratio. In this case, a melting point of an electrolyte prepared by mixing NaCl, NaBr, and $AlCl_3$ at a molar ratio of 1:1:2 was 130° C., such that it was confirmed that the melting point was lower than that of the single salt ($NaAlCl_4$ (Comparative Example 1) or $NaAlBr_4$ (Comparative Example 3)) and ion conductivity was suitable for implementing a battery.

Example 6

A melting point was confirmed while mixing three kinds of salts (that is, third salts (NaCl and NaBr) and a fourth salt ($AlBr_3$)) at a predetermined ratio. In this case, a melting point of an electrolyte prepared by mixing NaCl, NaBr, and $AlBr_3$ at a molar ratio of 3:1:4 was 140° C., such that it was confirmed that the melting point was lower than that of the single salt ($NaAlCl_4$ (Comparative Example 1) or $NaAlBr_4$ (Comparative Example 3)) and ion conductivity was suitable for implementing a battery.

Example 7

A melting point was confirmed while mixing three kinds of salts (that is, third salts (NaCl and NaBr) and a fourth salt ($AlBr_3$)) at a predetermined ratio. In this case, a melting point of an electrolyte prepared by mixing NaCl, NaBr, and $AlBr_3$ at a molar ratio of 1:1:2 was 146° C., such that it was confirmed that the melting point was lower than that of the single salt ($NaAlCl_4$ (Comparative Example 1) or $NaAlBr_4$ (Comparative Example 3)) and ion conductivity was suitable for implementing a battery.

Example 8

A melting point was confirmed while mixing four kinds of salts (that is, third salts (NaBr and NaI) and fourth salts ($AlBr_3$ and $AlI_3$) at a predetermined ratio. In this case, a melting point of an electrolyte prepared by mixing NaBr, NaI, $AlBr_3$, and $AlI_3$ at a molar ratio of 49:21:21:9 was 155° C., such that it was confirmed that the melting point was lower than that of the single salt ($NaAlI_4$ (Comparative Example 2) or $NaAlBr_4$ (Comparative Example 3)) and ion conductivity was suitable for implementing a battery.

Example 9

A melting point was confirmed while mixing four kinds of salts (that is, third salts (NaBr and NaI) and fourth salts ($AlBr_3$ and $AlI_3$) at a predetermined ratio. In this case, a melting point of an electrolyte prepared by mixing NaBr, NaI, $AlBr_3$, and $AlI_3$ at a molar ratio of 49:21:21:9 was 155° C., such that it was confirmed that the melting point was lower than that of the single salt ($NaAlI_4$ (Comparative Example 2) or $NaAlBr_4$ (Comparative Example 3)) and ion conductivity was suitable for implementing a battery.

$NaAlCl_{2.8}Br_{1.2}$ was formed as an electrolyte material by mixing according to Example 9, and the residues (a; NaBr, NaI) of the third salt that did not participate in forming the electrolyte material may act as the electrode active material in a state in which the residues were molten in the electrolyte material. In detail, NaBr, NaI, $AlBr_3$, and $AlI_3$ were mixed with each other at the molar ratio of 49:21:21:9 according to Example 9, such that $NaAlCl_{2.8}Br_{1.2}$ was formed as the electrolyte material, 0.9333 M NaCl and 0.4 M NaI remained as the residues. In this case, 0.9333 M NaCl and 0.4 M NaI, which were residues, may act as the electrode active material in the state in which they were molten in the $NaAlCl_{2.8}Br_{1.2}$ electrolyte.

When Example 9 was compared with Example 8 according to the following [Table 1], it may be confirmed that performance of the battery may be improved by over-supplying a small amount of sodium halide at the time of forming the electrolyte material to allow the sodium halide to act as the electrode active material.

Comparative Example 1

A single salt ($NaAlCl_4$) was prepared by mixing NaCl and $AlCl_3$ at a molar ratio of 1:1. Then, a melting point and ion conductivity of the prepared $NaAlCl_4$ were measured, and the results were shown in [Table 1]. Here, in the case of NaCl, NaCl having a purity of 99.99% was used, and in the case of $AlCl_3$, purified $AlCl_3$ was used.

Comparative Example 2

A single salt ($NaAlI_4$) was prepared by mixing NaI and $AlI_3$ at a molar ratio of 1:1. Then, a melting point and ion conductivity of the prepared $NaAlI_4$ were measured, and the results were shown in [Table 1]. Here, in the case of NaI, NaI having a purity of 99% was used, and in the case of $AlI_3$, purified $AlI_3$ was used.

Comparative Example 3

A single salt ($NaAlBr_4$) was prepared by mixing NaBr and $AlBr_3$ at a molar ratio of 1:1. Then, a melting point and ion conductivity of the prepared $NaAlBr_4$ were measured, and the results were shown in [Table 1]. Here, in the case of NaBr, NaBr having a purity of 99% was used, and in the case of $AlBr_3$, purified $AlBr_3$ was used.

TABLE 1

| Classification | Molten Salt Electrolyte | Melting Point (° C.) | Ion Conductivity (ms/cm, 180° C.) |
| --- | --- | --- | --- |
| Example 1 | $NaAlCl_{3.8}I_{0.2}$ | 150 | 305.23 |
| Example 2 | $NaAlCl_{3.6}I_{0.4}$ | 130 | 284.10 |
| Example 3 | $NaAlCl_{2.8}I_{1.2}$ | 100 | 260.33 |
| Example 4 | $NaAlCl_{3.25}Br_{0.75}$ | 113 | 350.23 |
| Example 5 | $NaAlCl_{3.5}Br_{0.5}$ | 130 | 342.34 |
| Example 6 | $NaAlCl_{0.75}Br_{3.25}$ | 140 | 305.11 |
| Example 7 | $NaAlCl_{0.5}Br_{3.5}$ | 146 | 306.66 |
| Example 8 | $NaAlCl_{2.8}Br_{1.2}$ | 155 | 306.50 |
| Example 9 | $NaAlCl_{2.8}Br_{1.2} + \alpha$ | 155 | 316.46 |
| Comparative Example 1 | $NaAlCl_4$ | 155 | 316.46 |
| Comparative Example 2 | $NaAlI_4$ | 260 | 163.75 (260° C.) |
| Comparative Example 3 | $NaAlBr_4$ | 200 | 387.36 (220° C.) |

Meanwhile, the sodium secondary battery according to the present invention, using the molten salt electrolyte configured as described above, has significantly excellent advantages in that the sodium secondary battery may operate in a relatively low temperature range, stably maintain a molten state at an operation temperature and pressure of the secondary battery, facilitate diffusion of sodium ions introduced through a solid electrolyte, stabilize charge and discharge cycle characteristics without undesired side reactions, and improve preservation characteristics capable of preventing self-discharge.

In detail, the sodium secondary battery according to the present invention may be configured of an anode, a cathode, a solid electrolyte, and an electrolyte in which the cathode is impregnated as shown in FIG. 1.

In the sodium secondary battery according to an exemplary embodiment of the present invention, the anode may contain a sodium metal or sodium alloy. As a non-restrictive example, the sodium alloy may be an alloy of sodium and cesium, an alloy of sodium and rubidium, or a mixture thereof. An anode active material may be a solid-state material or a liquid-state material including a molten state material at the operation temperature of the battery. In this case, in order to implement capacity of the battery so as to be 50 Wh/kg or more, the anode active material may be molten sodium (molten Na).

Further, in the sodium secondary battery according to an exemplary embodiment of the present invention, the cathode of the sodium secondary battery may contain a transition metal and an alkali metal halide. Here, the transition metal may include copper, silver, gold, nickel, palladium, platinum, cobalt, rhodium, iridium, iron, manganese, chromium, vanadium, molybdenum, or the like. Preferably, the transition metal may be one metal selected from nickel (Ni), copper (Cu), and iron (Fe). In addition, as the alkali metal halide, a sodium halide (NaX; X=halide) may be used. In this case, as the halogen X, fluorine (F), chlorine (Cl), bromine (Br), iodine (I), astatine (At) may be used, but among them, chlorine (Cl), bromine (Br), and iodine (I) may be preferable.

Further, in the sodium secondary battery according to an exemplary embodiment of the present invention, the cathode may be configured so as to be impregnated in the molten salt electrolyte. Specifically, the molten salt electrolyte may contain a sodium.metal halogen salt including at least two kinds of halogens. In more detail, the molten salt electrolyte may be a molten salt electrolyte containing the above-mentioned sodium.metal halogen salt represented by Chemical Formula 1. In this case, Chemical Formula 1 may be embodied as described above, and this molten salt electrolyte may have a low melting point at a specific content according to the contents of at least two kinds of halogens contained therein. A specific description of the molten salt electrolyte according to the present invention will be replaced with the above-mentioned description.

In the sodium secondary battery according to the present invention configured as described above, a charge reaction may be carried out according to the following Reaction Formula 1, and a discharge reaction may be carried out according to the following Reaction Formula 2.

$$mNaX+M \rightarrow mNa+MX_m \quad \text{Reaction Formula 1}$$

$$mNa+MX_m \rightarrow mNaX+M \quad \text{Reaction Formula 2}$$

In Reaction Formulas 1 and 2, M is at least one metal selected from a transition metal group, X is a halogen element, and m is a natural number of 1 to 4. In detail, in Reaction Formulas 1 and 2, m may be a natural number corresponding to a positive valence of the metal M.

In describing the sodium secondary battery according to an exemplary embodiment of the present invention, for clear understanding, the cathode and the charge and discharge reactions are described above, based on reaction products or materials (the sodium halide, a transition metal halide, or the like) at the time of the charge and discharge reactions according to Reaction Formulas 1 and 2.

Further, in the sodium secondary battery according to an exemplary embodiment of the present invention, the solid electrolyte may be provided between the cathode and the anode and formed of a sodium ion conductive solid electrolyte. In this case, as sodium ion conductive solid electrolyte, any material may be used as long as it physically separates the cathode and the anode from each other, and has selective conductivity for the sodium ion. In addition, any solid electrolyte may be used as long as it is generally used for selective conduction of the sodium ion in a battery field. As a non-restrictive example, the solid electrolyte according to the present invention may be Na super ionic conductor (NASICON), β-alumina, or β″-alumina. In addition, as a non-restrictive example, the NASICON may include a Na—Zr—Si—O based complex oxide, a Na—Zr—Si—P—O based complex oxide, a Y-doped Na—Zr—Si—P—O based complex oxide, a Fe-doped Na—Zr—Si—P—O based complex oxide, or a mixture thereof. In detail, the NASICON may include $Na_3Zr_2Si_2PO_{12}$, $Na_{1+x}Si_xZr_2P_{3-x}O_{12}$ (x is a real number satisfying the following Inequality: 1.6<x<2.4), Y- or Fe-doped $Na_3Zr_2Si_2PO_{12}$, Y- or Fe-doped $Na_{1+x}Si_xZr_2P_{3-x}O_{12}$ (x is a real number satisfying the following Inequality: 1.6<x<2.4), or a mixture thereof.

The sodium secondary battery according to the exemplary embodiment of the present invention may have a plate type battery structure including a plate shaped solid electrolyte or a tube type battery structure including a tube shaped solid electrolyte of which one end is closed, based on a shape of the solid electrolyte separating the anode and the cathode to partition off an anode space from a cathode space.

Meanwhile, in the cases of sodium-based secondary batteries according to the related art, there is a disadvantage in that a sodium-nickel chloride battery has an operation temperature of at least 250° C. or more, and a sodium-sulfur battery has an operation temperature of at least 300° C. or more, in consideration of conductivity and melting points of the battery composition.

However, in the sodium secondary battery according to the present invention, the melting point of the electrolyte is adjusted without deteriorating ion conductivity of the sodium secondary battery by using the molten salt electrolyte containing the sodium.metal halogen salt including at least two kinds of halogens, such that the capacity of the battery may be implemented so as to be 50 Wh/kg or more at a low temperature. Specifically, the sodium secondary battery according to the present invention may have an operation temperature of 200° C. or less, more specifically, 100° C. or more but 200° C. or less.

In the sodium secondary battery according to the present invention, the melting point of the electrolyte is adjusted by using the molten salt electrolyte containing the sodium. metal halogen salt including at least two kinds of halogens, such that the battery may operate at a low temperature, and output efficiency of the battery may be significantly improved.

Further, in the sodium secondary battery using the molten salt electrolyte according to the present invention, the charge and discharge cycle characteristics may be stably maintained for a long period of time, and degradation may be prevented, such that the lifespan and stability of the battery may be improved.

Hereinabove, although the present invention is described by specific matters, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described embodiments, and the following claims as well as all modified equally or equivalently to the claims are intended to fall within the scope and spirit of the invention.

What is claimed is:

1. A sodium secondary battery comprising:
   an anode containing sodium;
   a cathode containing a transition metal and an alkali metal halide; and
   a sodium ion conductive solid electrolyte provided between the anode and the cathode,
   wherein the cathode is impregnated in a molten salt electrolyte represented by the following Chemical Formula 1.

$$NaM(X^1)_n(X^2)_{4-n} \quad \text{Chemical Formula 1}$$

In Chemical Formula 1,
M is an element selected from metal and metalloid groups having an oxidation number of 3;
$X^1$ and $X^2$ are each independently selected from halogen elements; and
n is more than 0 but less than 4 (0<n<4).

2. The sodium secondary battery of claim 1, wherein n is 0.2 or more but 3.8 or less (0.2≤n≤3.8).

3. The sodium secondary battery of claim 1, wherein $X^1$ is chlorine (Cl), and $X^2$ is iodine (I), and
n is 2.0 or more but 3.8 or less (2.0≤n≤3.8).

4. The sodium secondary battery of claim 1, wherein $X^1$ is chlorine (Cl), and $X^2$ is bromine (Br), and
n is 0.2 or more but 3.8 or less (0.2≤n≤3.8).

5. The sodium secondary battery of claim 1, wherein M is boron, aluminum, gallium, or indium.

6. The sodium secondary battery of claim 1, wherein the molten salt electrolyte has a melting point of 150° C. or less.

7. The sodium secondary battery of claim 1, wherein the molten salt electrolyte further contains an electrode active material made of a sodium halide salt.

8. The sodium secondary battery of claim 1, wherein the anode contains a sodium metal or a sodium alloy.

9. The sodium secondary battery of claim 1, wherein it has an operation temperature of 100 to 200° C.

* * * * *